April 4, 1939.  F. A. WIEGMAN  2,152,940

METHOD OF AND MEANS FOR FOLDING WEARING APPAREL

Filed Sept. 27, 1934  5 Sheets-Sheet 1

Inventor:
Floyd A. Wiegman

April 4, 1939.  F. A. WIEGMAN  2,152,940
METHOD OF AND MEANS FOR FOLDING WEARING APPAREL
Filed Sept. 27, 1934  5 Sheets-Sheet 5

Patented Apr. 4, 1939

2,152,940

UNITED STATES PATENT OFFICE 2,152,940

METHOD OF AND MEANS FOR FOLDING WEARING APPAREL

Floyd A. Wiegman, Chicago, Ill.

Application September 27, 1934, Serial No. 745,769

17 Claims. (Cl. 223—37)

More particularly the invention relates to a method of and device for folding laundered wearing apparel, such as men's shirts, etc., it being the general object of the invention to provide a new and improved method of this character together with a novel device for utilizing the method.

The method heretofore used quite generally in laundries for folding shirts consisted of buttoning several buttons of the shirt, then turning the shirt over with the bosom down on a finishing table and folding the sleeves, side and lower portions of the shirt while the shirt was face down. Due to the contact of the bosom of the shirt with the table, it was generally necessary to retouch the bosom with an iron in order to eliminate the wrinkles caused by the contact of the shirt with the table.

It is an object of the invention to provide a method for folding finished shirts whereby contact of the bosom of the shirt with other surfaces, such as the finishing table and even the hands of the finisher, is avoided, thus effectively preventing wrinkling and the necessity for retouching with an iron after the shirt has been folded.

Other objects are to provide a machine for folding shirts whereby it is unnecessary to place the shirt with the front down on a table during the folding operation, and whereby the buttoning of the lower buttons of the shirt is obviated.

Another object is to provide a new and improved method of folding shirts, together with a device for utilizing the method, whereby a simplified fold is obtained which requires less time to complete, and which leaves fewer creases and less wrinkles in the shirt when delivered to a customer.

It is also an object of the invention to provide a novel means for movably supporting a folding device for facilitating the use of the method.

Further objects will become readily apparent from the following detailed description taken in connection with the accompanying drawings, in which:

Fig. 3ᵃ is a fragmentary section approximately along the line 3ᵃ—3ᵃ of Fig. 3.

Fig. 5ᵃ is a fragmentary section along the line 5ᵃ—5ᵃ of Fig. 5.

Fig. 7 is a similar view showing the side portions of the doubled-back shirt folded in.

Figs. 11 to 17 illustrate another form of the invention.

Although there is illustrated in the drawings and hereinafter described in detail several devices embodying the invention and capable of utilizing the method, it is to be understood that these are for the purpose of illustrating the principles of the invention and that the invention is not limited to the particular forms illustrated. The scope of the invention will be pointed out in the appended claims.

Figures 1, 2, 3A, 5A:
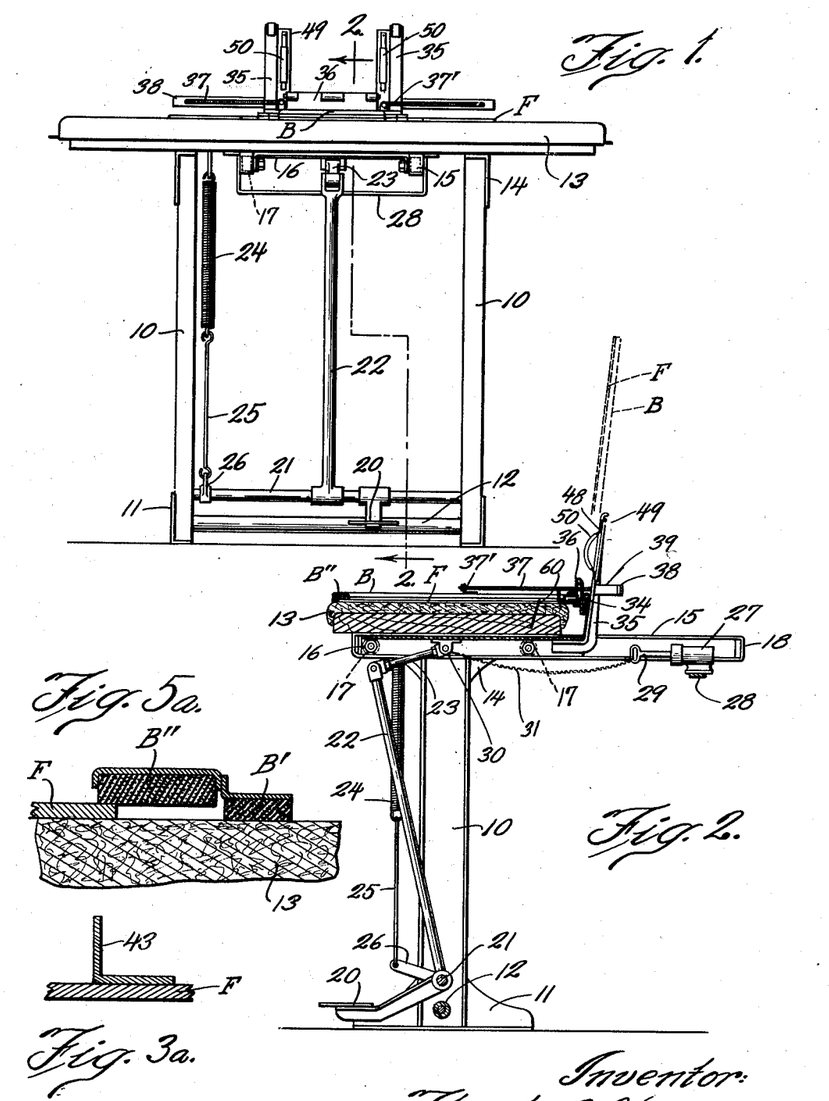
Fig. 1 is a front elevation of a preferred form of the invention associated with a finishing table.
Fig. 2 is a vertical section approximately along the line 2—2 of Fig. 1.

Referring first to Figs. 1 and 2, which illustrate a preferred form of the invention associated with a finishing table, a padded finishing table 13 is supported on horizontally extending brackets 14 at the top of a pair of laterally spaced uprights 10, provided with suitable feet 11 and a tie rod 12.

A pair of laterally spaced channels 15 are secured to the underside of the table and project rearwardly therefrom to form guides for a carriage 16. This carriage has rollers 17 operable on the ways formed by the channels 15 and is movable from a forward position, as illustrated in Fig. 2, to a rearward position wherein the rear rollers 17 stop against end abutments 18 on the channels. The carriage 16 is arranged to be operated by means including a foot pedal 20 which is secured to a cross shaft 21 rotatably mounted at its ends in the uprights 10. The shaft 21 carries an upwardly extending arm 22 which at its upper end is connected to the carriage by means of a link 23. Thus the carriage may be moved forwardly by depressing the pedal 20 and may be held in that position by the operator or finisher. For returning the carriage to its rearward position, a coiled spring 24 is preferably provided, anchored at one end to the table 13 and connected at its other end by means of an arm 25 to an arm 26 secured to the shaft 21. This spring functions, when the pedal 20 is released, to return the carriage. In order to cushion the return movement of the carriage, a suitable air check device 27 is mounted on a cross strip 28 extending between the rear ends of the channels 15 and positioned so that the plunger 29 thereof is engaged by a block 30 on the carriage as the carriage approaches the rearward position. A suitable chain 31 connects the plunger 29 to the block 30 so that during the forward movement of the carriage the plunger 29 is moved to its extended position.

Figure 3:
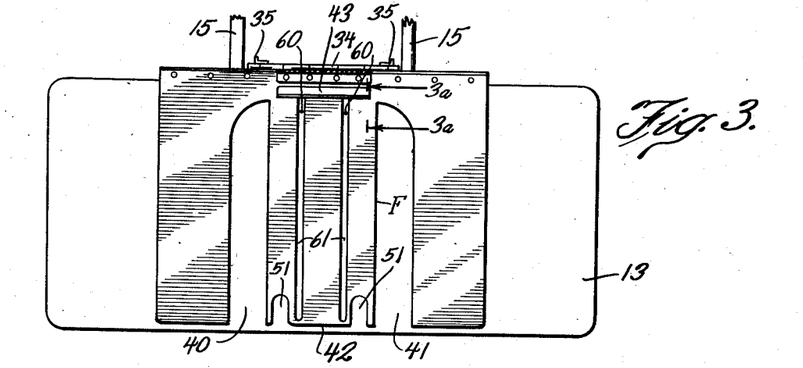
Fig. 3 is a fragmentary plan view of a preferred form of folding device, partly in section.
Figure 5:
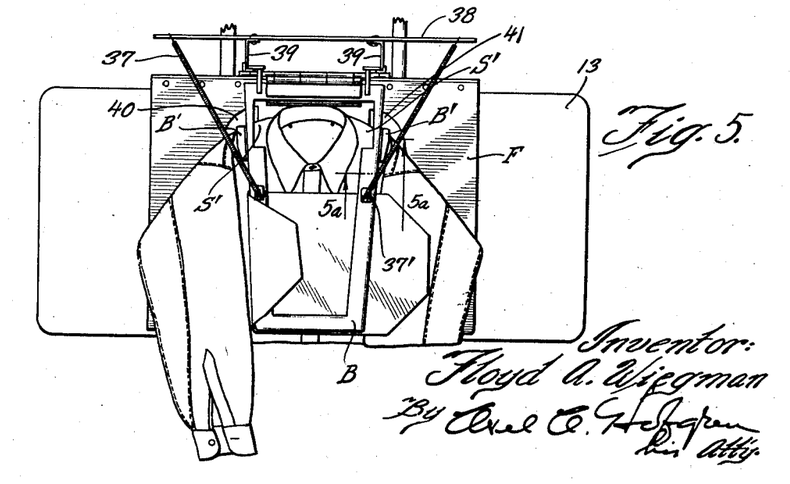
Fig. 5 is a plan view illustrating a bosom clamp lowered over the front of the shirt and the sleeves of the shirt folded.

As illustrated herein, a folding device is mounted on the carriage 16 and comprises generally a folding form F connected by means of a hinge 34 to a pair of L-shaped brackets 35 which are secured to the channels 15 and extend upwardly therefrom as illustrated in Figs. 1, 2 and 3. A somewhat trapezoidal frame B, hereinafter sometimes referred to as a bosom clamp, is hingedly connected to the form F by means of a hinge 36 the pivot axis of which is preferably positioned somewhat above the pivot axis of the hinge 34, as illustrated in Fig. 2. This frame is preferably open, as illustrated in Fig. 5, so as to permit the collar of the shirt to project therethrough and carries pad members B', preferably lined with soft rubber, as shown in Fig. 5ª, for holding down the shoulders of the shirt, as illustrated in Fig. 5. The under side of the forward portion of the frame may also be lined with soft rubber at B'', as shown in Figs. 2 and 5ª. These pads assist in holding the bosom of the shirt with the front edges of the shirt properly overlapped, during the folding operations.

The form F and the bosom clamp B may be swung as a unit from the horizontal position shown in Figs. 1 and 2 to the substantially vertical position illustrated in dotted lines in Fig. 2, for purposes hereinafter more fully pointed out. Preferably a pair of coiled springs 37 are secured at their forward ends to the frame B by brackets 37' and at their rear ends to a rod 38 secured to the brackets 35 by means of members 39. Preferably when the frame B is in its horizontal position, as shown in Fig. 2, the springs 37 extend between the pivot axes of the hinges 34 and 36 so as to be effective to hold the frame down against the form F and act as a bosom clamp for a shirt. These springs are also effective to hold the frame B in its raised position when the form F is moved downwardly from the dotted line position of Fig. 2, the springs 37 then extending above or outside the pivot axis of the hinge 36.

Figure 4:
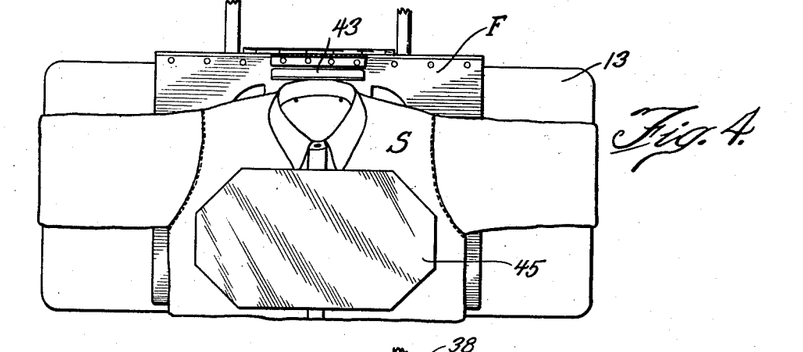
Fig. 4 is a similar view showing man's shirt as initially positioned prior to the folding operation.

The form F, as illustrated in Figs. 1 to 9 inclusive, is somewhat rectangular in shape and is preferably formed of a light weight, durable material such as aluminum. The form is slotted at 40 and 41 so as to provide a central portion 42 which serves as a form for the bosom of the shirt, and determines the size of the folded shirt package, as will hereinafter become more fully apparent. An angle 43 secured to the form F facilitates locating a shirt S on the form and serves as a collar stop or guide, as illustrated in Fig. 4. The form F is movable from a position overlying the table 13, as illustrated in Fig. 3, to a rearward position corresponding to the rear position of the carriage 16, where the front edge of the form F rests on the rear portion of the table 13. In the drawings the carriage is shown in its forward position where it is held by the pressure of an operator's foot (not shown) on the pedal 20.

Figure 6:
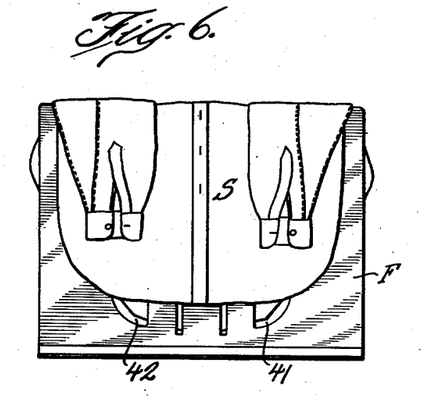
Fig. 6 is a bottom view of the form of the folding device with a shirt thereon doubled back.
Figure 7:
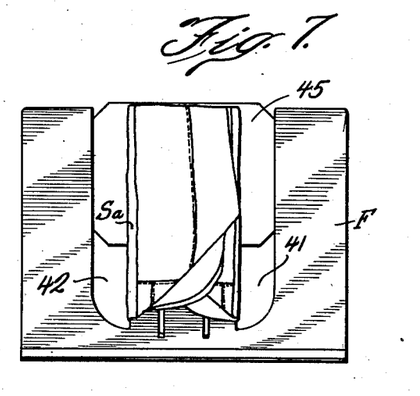
Figure 9:
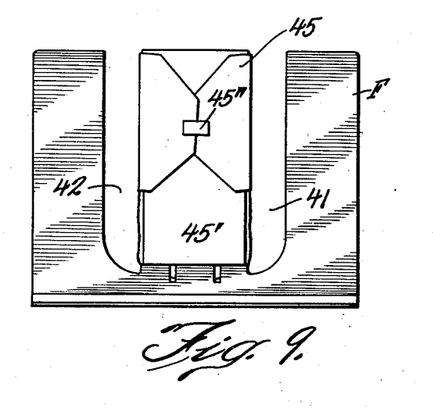
Fig. 9 shows a wrapper placed around the shirt and cardboard while the shirt is still on the form.
Figure 10:
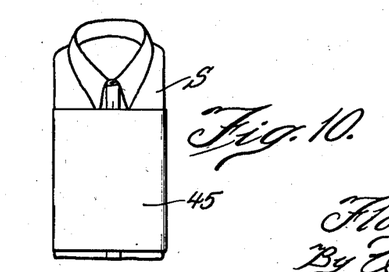
Fig. 10 illustrates a folded shirt with the envelope thereon.
Figure 11:
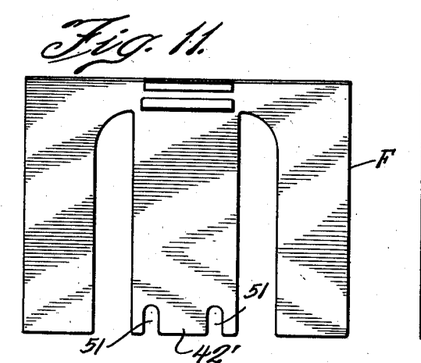
Fig. 11 is a plan view of a folding form.
Figure 19:
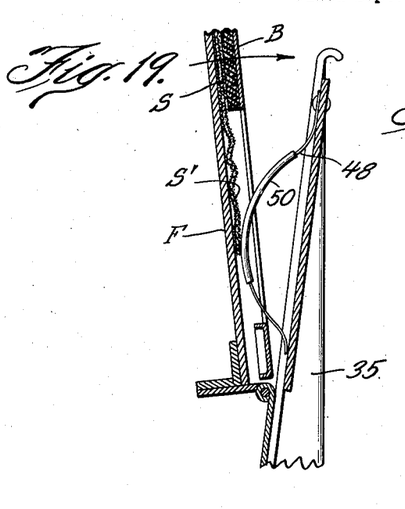
Fig. 19 is an enlarged fragmentary section of a means for stretching a portion of the shirt during the folding operation.
Figure 20:
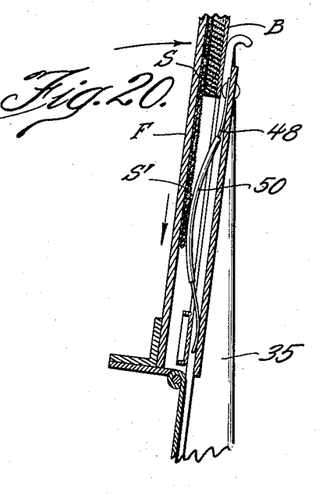
Fig. 20 is a similar view showing the shirt portion stretched.

When a finisher has completed a shirt and is about to fold it, he fastens the front of the neck band either by means of a collar button or other suitable device, and stretches the shirt out on the table 13 (the form F being then withdrawn) with the sleeves extending sidewardly, as shown in Fig. 4, and the bosom of the shirt facing up. While holding the shirt in this position the finisher steps on the pedal 20, whereupon the form F slides along the surface of the table 13 and in under the shirt to the position shown in Fig. 4. The shirt is then shifted, if necessary, to bring the collar against the guide 43. With the lower buttons of the shirt unbuttoned, but the front portions of the shirt properly overlapped, and the lower portion hanging over the front edge of the table, the finisher places a piece of paper or wrapper 45 somewhat in the position shown in Fig. 4, this piece of paper later becoming part of the shirt envelope, as indicated in Figs. 9 and 10. The bosom clamp B is then lowered to the position shown in Fig. 5, the pad members B' on the frame B then serving to hold the shoulders of the shirt down against the table. The ends of the paper 45 are then raised temporarily to permit the finisher to fold the sleeves forwardly over the front of the shirt, as shown in Fig. 5. During this operation the forward side edges of the frame B serve as a guide to indicate where the inner edges of the sleeves shall be placed, the frame tapering inwardly from the shoulder pads B' as illustrated. When the sleeves have been folded, as shown in Fig. 5, the finisher raises the form F and frame B, preferably holding them together by grasping them at their forward edges, and moves the form and frame upwardly to the dotted line position shown in Fig. 2. In doing so, the ends of the sleeves and the lower portion of the shirt double over the form F, as illustrated in Fig. 6. In order to prevent puckering of the shirt at the shoulders S' (Fig. 5), a pair of resilient or spring members 48 are mounted on projecting portions 49 of the brackets 35 and are preferably covered with rubber tubings 50 so as to function, as illustrated in Figs. 19 and 20, to stretch the shoulders S' of the shirt as the form F and frame B are moved up against the brackets 35. While the parts are in this position, the finisher holds his left hand against the central, doubled-back portion of the shirt (Fig. 6), while the right-hand side of the shirt is folded in by hand through the slot 41, and thereafter the finisher holds the folded-in portion against the form with his right hand, while the left-hand side of the shirt is folded in through slot 42, so that the folded-in portions overlap, as illustrated in Fig. 7. During the folding operations with the form F in elevated position, the frame B is held against the front of the shirt to maintain the bosom intact, by the pressure of the operator's hands against the back of the form.

Figure 8:
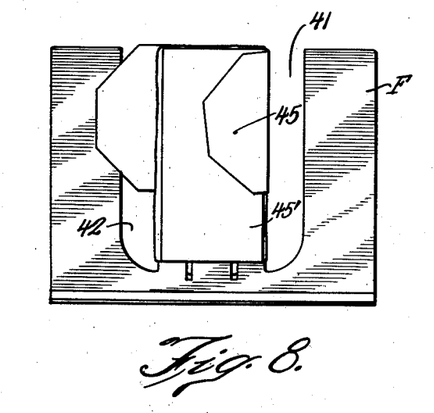
Fig. 8 is a similar view showing a cardboard applied to the folded shirt while still on the form.

After the folding operations, a cardboard 45' is positioned over the folded-in portions of the shirt, as illustrated in Fig. 8, and the ends of the wrapper 45 are doubled back and then fastened by means of a sticker 45'', as illustrated in Fig. 9. During all of these operations the finisher has maintained his foot on the pedal 20 so that now when he pulls the form F downwardly to a position overlying the table again (the frame B now remaining in its upper position due to the tension of the springs 37), the finisher, by grasping the packaged shirt with his fingers at positions corresponding to cut-out thumb notches 51 in the form F (Fig. 3), can readily slide the folded and wrapped shirt off the form by releasing the pedal 20 and thereby withdrawing the form rearwardly out of the shirt. The notches 51 are provided so that when the finisher grasps the shirt he does not grasp the form also. Thus the packaged shirt is left, face up, on the table, and may be examined quickly before removal.

Figure 12:
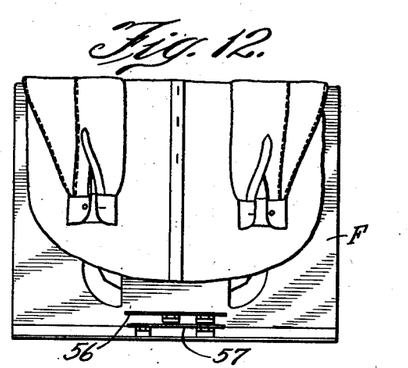
Fig. 12 is a bottom view of the form of Fig. 11 with a shirt doubled back thereon.
Figure 13:
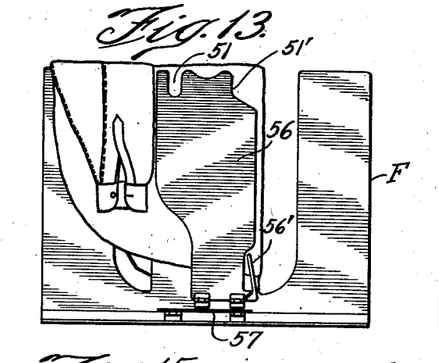
Fig. 13 illustrates one side of the shirt folded in and a holding member swung up against the folded-in portion.
Figure 14:
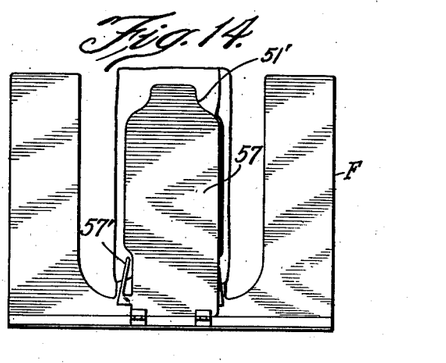
Fig. 14 shows the remaining side folded in and a second folding member swung up.
Figures 15, 16, 18:
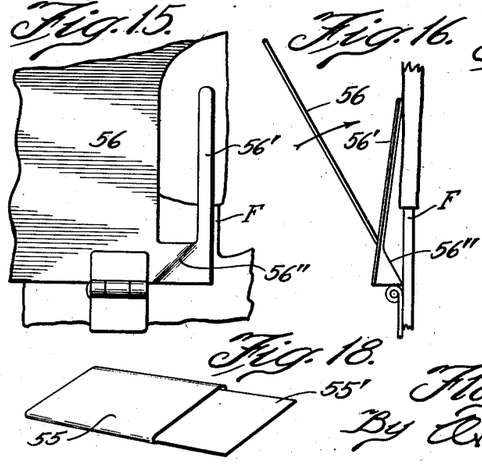
Fig. 15 is an enlarged fragmentary view showing a finger construction for drawing a portion of the shirt snugly around the form.
Fig. 16 is a view looking from the right at Fig. 15.
Fig. 18 is a perspective view of a type of shirt envelope particularly adapted for use with the form of the invention illustrated in Figs. 11 to 17.

In some instances, laundries prefer to use a shirt envelope of the type illustrated in Fig. 18, wherein a piece of paper 55 overlies the lower portion of a cardboard 55' and has its edges already gummed to the back of the cardboard. When such an envelope is used, it is desirable to fold the shirt more compactly against the back of the form F so as to facilitate sliding the envelope over the folded shirt and form. The embodiment of the invention illustrated in Figs. 11 to 17 is preferable in folding a shirt for use with this type of envelope. As illustrated in these figures, a pair of hinged elements or flaps 56 and 57 are secured to the back of the form F and are arranged to be swung up against the folded-in portions of the shirt succesively during the folding operation. Flap 56 has a notch 51 and a corner notch 51', part of which coincides with the corresponding notch 51 in the form F. Flap 57 has two corner notches 51'. These members are preferably of polished metal of light weight, such as aluminum, and lie under the form F when the form is in its lowered position on the table 13. In utilizing this form of the invention, a shirt is first placed on the finishing table in the manner indicated in Fig. 4, and then the form F (together with the flaps 56 and 57) is slid under the shirt to the position indicated in Fig. 4. Then, after bringing the frame B down and folding the sleeves in the same manner as indicated in Fig. 5, the form F is swung up against the brackets 35 so that the lower portion of the shirt and the ends of the sleeves double over the form as illustrated in Fig. 12. During this movement of the form the flaps 56 and 57 remain in a substantially horizontal position as indicated. Thereafter, upon folding the right side of the shirt in through slot 41 in the form, to the position indicated in Fig. 13, the finisher raises the flap 56 to the position shown in said figure, so as to press the folded portion of the shirt compactly against the form. During this movement of the flap 56, a finger 56' on the flap serves to draw the lower portion of the shirt inwardly or toward the left in Fig. 13, and thereby keeps it sufficiently tight around the central portion 42' of the form. Thereafter the lefthand side of the shirt is folded in over the flap 56 and the flap 57 is raised and moved against the folded-in portion of the shirt, as illustrated in Fig. 14, a finger 57' performing a similar operation on the lower portion of the shirt.

Figure 17:
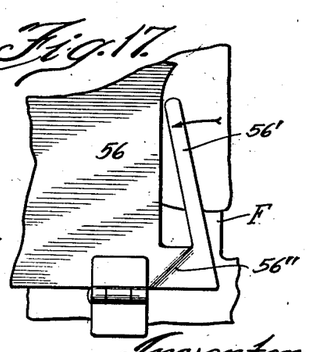
Fig. 17 is a view similar to Fig. 15 but with the finger moved laterally to the position occupied when the holding member is up against the shirt.

The fingers 56' and 57', together with their operation, are illustrated more clearly in Figs. 15 to 17 inclusive. As shown in Figs. 15 and 16, the finger 56' is normally parallel to the side edge of the form F but (see Fig. 16), is bent at an angle to the plane of the flap 56 by a suitable angular bend 56''. This angular bend is such that when the flap 56 is moved forcibly toward the form F (Fig. 16) so that the finger is bent into the plane of the flap, the finger 56' swings crosswise or inwardly to the position shown in Fig. 17, and thereby draws in the adjacent portion of the shirt and prevents a bulge of the material. While the parts are in the position illustrated in Fig. 14, an envelope of the type illustrated in Fig. 18 is slipped over the folded shirt, form and flaps, after which, by lowering the form onto the table and grasping the folded shirt and envelope over the thumb notches 51, the operator can release the pedal 20, whereupon the form and flaps are withdrawn rearwardly from the finished package. Upon removing the finished package, the table 13 is clear and ready for receiving the next shirt.

When the form F is moved forwardly under the outstretched shirt to the position shown in Fig. 4, the form serves to straighten out wrinkles in the back of the shirt. If a padded table 13 is used in connection with the folding device the friction of the pad against the back of the shirt is generally sufficient to hold the shirt in the position shown in Fig. 4 while the form is being slid under. Should a smooth board be substituted for the padded table, a pair of upwardly projecting pins 60 (Figs. 2 and 3) may be provided to which the shirt may be attached before the form F is slid under. The form F is then slotted at 61 to provide clearance for the pins during forward movement of the form.

Figure 21:
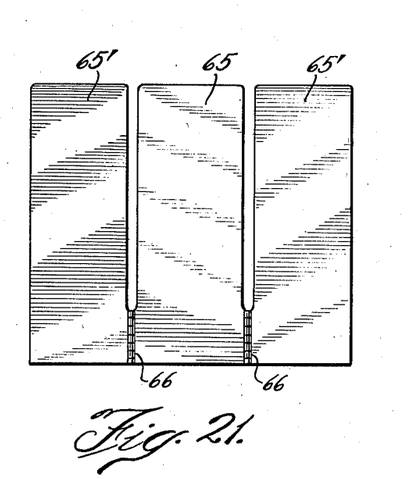
Figs. 21 and 22 illustrate other types of forms which may be used in the folding device.
Figure 22:
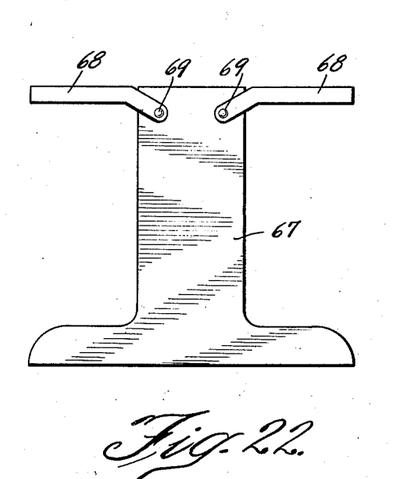

In Figs. 21 and 22 modified constructions of the folding form F are illustrated. Thus in Fig. 21 the form shown has a central portion 65 and pivotally mounted side extensions 65' movably secured to the central portion 65 by means of suitable hinges 66. After the shirt has been doubled back initially in a manner similar to that illustrated in Fig. 6, the side portion 65' may be swung around with the sides of the shirt so as to fold in the sides of the shirt and place them against the back of the central portion 65. The hinges 66 are preferably of a suitable spring type so that normally the side extensions 65' are maintained in the positions illustrated.

As illustrated in Fig. 22, the form has a central portion 67 and movable extensions 68 pivoted to the central portion 67 at 69. These extensions also serve to support the side portions of the shirt during the initial doubling-back of the lower portion of the shirt, and thereafter the extensions may be pivoted downwardly to an out-of-the-way position while the sides of the shirt are folded in.

It is believed readily apparent that the invention provides not only a simple and efficient method for folding shirts without wrinkling the bosom thereof, but also a device which facilitates the use of the method. Considerable time is saved by this method of folding a shirt, since it is unnecessary to button lower buttons preparatory to the folding operation, and furthermore a form is provided about which the shirt is folded to the exact size desired for insertion in an envelope. It is of particular advantage to be able to package the shirt without buttoning the lower buttons, since by delivering the shirt in this unbuttoned form to the owner, it is unnecessary for him to wrinkle the front of the shirt for the purpose of unbuttoning the buttons, the shirt, upon being withdrawn from the envelope, unfolding completely so as to be ready to wear. The neck band of the shirt may be either buttoned at the front or secured by a suitable clasp, but since this operation is generally performed prior to the final operation of finishing the collar it adds nothing to the time required for folding the shirt.

In the various forms illustrated herein, the form F is provided with lateral extensions for supporting the sides of the shirt while it is being doubled over, as shown most clearly in Fig. 6. In the form illustrated in Figs. 1 to 9, provision is made for folding in the sides of the shirt by having relatively large slots 40 and 41 in the form, through which the side portions of the shirt may be drawn. As illustrated in Figs. 21 and 22, movable side extensions are provided on the forms, these extensions being movable to out-of-the-way positions while the sides of the shirt are being folded in. Although these side extensions are desirable, and in most instances facilitate the folding of the shirt, they are not indispensable since the central portion of the form may be sufficient not only for the folding in of the sides, but also for the prior operation of doubling back or under the lower portion of the shirt and the ends of the sleeves.

The frame B, in the form illustrated herein, has been found very satisfactory in operation not only for the purpose of maintaining the bosom of the shirt properly flat, with the front portions of the shirt properly overlapped, but also for the purpose of maintaining the shoulders against the table under the shoulder pads B'. The frame may, of course, assume different forms and in some instances it may be found sufficient to provide a frame carrying shoulder pads but without the forwardly extending portion which engages the front of the shirt and forms a guide for folding the sleeves. When a shirt is held against the table by means of the shoulder pads and is then doubled back, as shown in Fig. 6, the pressure of the operator's hand on the central lower portion of the shirt may be sufficient to maintain the bosom of the shirt properly overlapped during the folding-in operations of the sides, even though the lower buttons of the bosom are not buttoned.

As will be apparent from Figs. 5 and 6, the shoulder pads cause the arms to be folded at points spaced outwardly from the central portion of the form. Thus, when the sides of the shirt are folded in, as shown in Fig. 7, the outer edges of the sleeves are an inch or so from the side edges of the shirt at S$^a$, so as effectively to prevent the sleeves from extending beyond the side edges of the form when completely folded.

I claim as my invention:

1. A method of folding a shirt comprising stretching the shirt out on its back with the arms extending sidewardly, the neck band secured in buttoned position and the front of the shirt arranged with the edges suitably overlapped, folding the sleeves diagonally at the shoulders and placing them in substantially parallel laterally spaced positions over the front of the shirt and alongside the bosom thereof, doubling back the lower portion of the shirt and the ends of the sleeves so as to determine the length of the finished package, and then folding back the side portions of the shirt and the sleeves.

2. A method of folding a shirt comprising placing the shirt on its back with the neck band secured in buttoned position and the front of the shirt arranged with the edges suitably overlapped, folding the sleeves diagonally at the shoulders and placing them in substantially parallel laterally spaced positions, doubling back the lower portion of the shirt and the ends of the sleeves so as to determine the length of the finished package, and then folding back the side portions of the shirt and the sleeves to determine the width of the package.

3. A method of folding a shirt with the aid of a pivotally mounted form of a size substantially equal to that of the shirt when folded, comprising placing the shirt on its back on the form with the arms extending sidewardly and the front of the shirt arranged with the edges suitably overlapped, folding the sleeves diagonally at the shoulders and placing them in substantially parallel laterally spaced positions over the front of the shirt and alongside the bosom thereof, swinging the form upwardly and doubling back the lower portion of the shirt and the ends of the sleeves over the form so as to determine the length of the finished package, folding in the doubled-over side portions of the shirt and sleeves around the form to determine the width of the finished package, and surrounding the folded shirt with a retaining envelope before withdrawing the form.

4. A shirt folding device comprising a form having an outline substantially conforming to the exposed front of the shirt when completely folded, means for pivotally supporting said form at one end for movement from a horizontal position wherein a shirt may be placed front upwards partly thereon, to an upwardly extending position wherein portions of the shirt may be readily folded back over the form, means for limiting the upward movement of the form to a somewhat vertical position, said form having a means for temporarily supporting the outer edges of a shirt in an upward facing partially folded position, means forming apertures adjacent the supporting means to admit passage of said outer edges therethrough when folded toward the back of the shirt, and means for clamping the bosom of the shirt to the form during the folding operations.

5. A shirt folding device comprising a form having an outline substantially conforming to the exposed front of the shirt when completely folded having lateral edges to support the folds of the shirt, means for pivotally supporting said form at one end for movement from a horizontal position wherein a shirt may be placed front upwards partly thereon, to an upwardly extending position wherein portions of the shirt may be readily folded back over the form, means separated from said lateral edges forming lateral extensions to the free end of the form so as to provide an end of a length substantially equal to the width of the shirt when fully spread out over which the entire width of the shirt may be doubled back, means for limiting the downward movement of the form to facilitate placing the shirt thereon, and means for limiting the upward movement of the form to facilitate folding the shirt thereon.

6. A folding device of the character described comprising a form having an outline substantially conforming to the shape of the shirt when completely folded, means forming extensions to the sides of the form partially separated therefrom by a slot extending longitudinally inward from one end providing an edge at said one end substantially equal in length to the width of the shirt unfolded over which the entire width of the shirt may be doubled back, and a clamping frame arranged to overlie said form when a shirt is positioned thereon so as to maintain the shirt bosom with the edges thereof suitably overlapped without buttoning the shirt during the folding operation.

7. A shirt folding device comprising, in combination, a form pivotally mounted for movement from a substantially horizontal position wherein a shirt may be placed partly thereon to a raised position permitting the shirt to be doubled back and under, said form having a central portion substantially equal in width to the finished shirt package and openings alongside said central portion, a bosom clamping frame superimposable on the central portion of said form to clamp the shoulders and bosom of the shirt in place on the form during the folding operation, means for pivotally connecting said frame to said form so that the frame may be moved with respect to the form, and a pair of flaps movably mounted on the back of the form and arranged to be interleaved with folded-back portions of the shirt to facilitate maintaining said portions compressed against the form while a shirt retaining envelope is applied, said flaps having fingers thereon arranged to draw portions of the shirt snugly about the central portion of the form.

8. A shirt folding device comprising, in combination, a form pivotally mounted for movement from a substantially horizontal position wherein a shirt may be placed thereon to a raised position permitting the lower portion of the shirt to be doubled back and under, said form having a central portion substantially equal in width to the finished shirt package, a bosom clamping frame superimposable on the central portion of said form to clamp the shoulders and bosom of the shirt in place on the form during the folding operation, means for movably supporting said frame so that the frame may be moved with the form and also moved with respect to the form, and means for maintaining the folded-back portions of the shirt compressed against the form while a shirt retaining envelope is applied.

9. A shirt folding device comprising, in combination, a form pivotally mounted for movement from a substantially horizontal position wherein a shirt may be placed partly thereon to a raised position permitting the lower portion of the shirt to be doubled over against the back of the form, said form having a central portion substantially equal in width to the finished shirt package, resilient means for automatically clamping the shoulders of the shirt in place on the form during the folding operation when the form is in a raised position, and means for maintaining the folded-back portions of the shirt compact against the form when raised, while a shirt retaining envelope is applied, said means including devices arranged to draw portions of the shirt snugly about the central portion of the form.

10. In combination with a finishing table, a carriage slidable in a front to rear direction of said table, foot-pedal-operated means for moving said carriage forwardly, and means for returning the carriage when the pedal is released, a shirt folding device comprising a form pivotally mounted on said carriage and arranged to overlie the table when the carriage is in its forward position so as to facilitate placing a shirt partly thereon, said form having a central portion substantially equal in width to the finished shirt package and side extensions adjacent the free end thereof so as to provide a folding edge for substantially the entire width of the shirt, a clamping frame operable to clamp a portion of the shirt over the central portion of the form during the folding operation, means on said carriage arranged to engage portions of the front of the shirt when the form is raised from the table to draw said portions over the form and prevent puckering, and means for compacting the folded-in portions of the shirt against the back of the form to facilitate applying a shirt envelope.

11. A shirt folding machine comprising, in combination, a table, a carriage slidable in a front to rear direction of said table, foot-pedal-operated means for moving said carriage forwardly, means for returning the carriage when the pedal is released, a shirt folding device comprising a form movably mounted on said carriage and arranged to overlie the table when the carriage is in its forward position so as to facilitate placing a shirt partly thereon, said form having a central portion substantially equal in width to the finished shirt package and side extensions adjacent the free end thereof so as to provide a folding edge for substantially the entire width of the shirt, a clamping frame operable to clamp a portion of the shirt over the central portion of the form during the folding operation, and means arranged to engage portions of the front of the shirt when the form is raised from the table to draw said portions over the form and prevent puckering.

12. In combination with a table, a carriage slidable in a front to rear direction of said table, means for moving said carriage, a shirt folding device comprising a form pivotally mounted on said carriage and arranged to overlie the table when the carriage is in its forward position so as to facilitate placing a shirt partly thereon, said form having a central portion substantially equal in width to the finished shirt package, means operable to clamp a portion of the shirt over the central portion of the form during the folding operation, and means for compacting the folded-in portions of the shirt against the back of the form to facilitate applying a shirt envelope.

13. A folding device of the character described comprising a form having an outline substantially conforming to the shape of the shirt when completely folded, a transverse edge of said form defining the fold extending transversely of the shirt intermediate the top and bottom of the shirt and parallel longitudinal edges defining the folds extending longitudinally of the shirt, and means positioned to each side of the form and separated therefrom adjacent said transverse edge and providing edges substantially aligned with the transverse edge of the form making that edge and the aligned edges substantially equal in length to the width of the unfolded shirt and over which edges the entire width of the shirt may be doubled back to obtain a straight fold.

14. A folding device of the character described comprising a form having an outline substantially conforming to the shape of the shirt when completely folded, a transverse edge of the form determining the fold extending crosswise of the shirt intermediate the top and the bottom thereof and parallel longitudinal edges determining the longitudinal folds of the shirt, and movably supported means positioned to each side of the form partially separated from said form providing edges which are substantially alined with the transverse edge of the form, said combined edges being substantially equal in length to the width of the shirt unfolded and over which the entire width of the shirt may be doubled back, said means being movable to permit the folding back of the side portions of the shirt.

15. A shirt folding device comprising, in combination, a form pivotally mounted for movement from a substantially horizontal position wherein a shirt may be placed partly thereon with the front upward to a raised position permitting the shirt to be doubled back over the form, said form having a central portion substantially equal in size to the finished shirt package around which the shirt may be folded, spring means automatically frictionally engaging the shirt adjacent the neck band when the form is in a raised position to stretch out portions of the shirt adjacent the neck band during the folding operation to prevent puckering, movable means for compacting the folded end portions of the shirt against the back of the form to facilitate applying a shirt envelope, and a resilient finger engaging the shirt prior to engagement thereof by said compacting means and operating as an incident to such engagement and to the movement of said compacting means to draw in the shirt.

16. A shirt folding device comprising, in combination, a form pivotally mounted at one edge for movement from a substantially horizontal position wherein a shirt may be placed partly thereon to a raised position permitting the shirt to be doubled back over the free edge of the form, said form being of a width substantially equal to the width of the shirt when unfolded so as to support the shirt throughout its entire width when the form is swung to raised position and having laterally spaced slots opening through the free edge of the form at points spaced inwardly from the side edges thereof to form a central portion substantially equal in width to the exposed front of the shirt when completely folded and said wing portions with edges substantially aligned with the free edge of the central portion, said slots permitting the sides of the shirt to be folded upon said central portion.

17. A shirt folding device comprising, in combination, a form having an outline corresponding substantially to the exposed front of the shirt when completely folded, a pair of extensions at the sides of said form having sufficient width to support the outer unfolded edges of the shirt in a substantially face upward position and having edges substantially aligned with one end of the form to provide a supporting means extending transversely of the form and of the shirt over which the entire width of the lower portion of a shirt may be doubled back, and means pivotally securing said extensions to the form so that the extensions may be swung against the form with the side portions of a shirt during a subsequent folding operation.

FLOYD A. WIEGMAN.